(12) United States Patent
Oettinger et al.

(10) Patent No.: US 12,552,224 B2
(45) Date of Patent: Feb. 17, 2026

(54) FRESH AIR DEVICE

(71) Applicant: JOSEPH VOEGELE AG, Ludwigshafen/Rhein (DE)

(72) Inventors: Klaus Oettinger, Altlussheim (DE); Bastian Fleischer, Waghaeusel (DE)

(73) Assignee: Joseph Voegele AG, Ludwigshafen/Rhein (DE)

( * ) Notice: Subject to any disclaimer, the term of this patent is extended or adjusted under 35 U.S.C. 154(b) by 379 days.

(21) Appl. No.: 18/127,712

(22) Filed: Mar. 29, 2023

(65) Prior Publication Data
US 2023/0311613 A1 Oct. 5, 2023

(30) Foreign Application Priority Data
Mar. 29, 2022 (EP) .................................... 22164924

(51) Int. Cl.
*B60H 1/00* (2006.01)
*B60H 1/34* (2006.01)

(52) U.S. Cl.
CPC ....... *B60H 1/00378* (2013.01); *B60H 1/0025* (2013.01); *B60H 1/00564* (2013.01); *B60H 1/3414* (2013.01); *B60H 2001/00214* (2013.01)

(58) Field of Classification Search
CPC ............. B60H 1/0025; B60H 1/00378; B60H 1/00564; B60H 1/3407; B60H 1/3414; B60H 2001/00228
USPC .................................................... 296/190.09
See application file for complete search history.

(56) References Cited

U.S. PATENT DOCUMENTS

| | | | |
|---|---|---|---|
| 4,531,453 A * | 7/1985 | Warman ............. | B60H 1/00378 55/330 |
| 6,290,286 B1 | 9/2001 | Maurakami et al. | |
| 6,843,717 B1 * | 1/2005 | Bennett ............. | B60H 1/00564 128/204.15 |
| 6,884,159 B1 * | 4/2005 | Ferraud, Jr. ........ | B60H 1/00564 454/119 |
| 2006/0258282 A1 * | 11/2006 | Heck ...................... | B60H 1/244 454/143 |
| 2019/0016196 A1 * | 1/2019 | Ye .......................... | B60H 3/022 |
| 2019/0160986 A1 * | 5/2019 | Tsai ...................... | B60H 1/0025 |
| 2020/0079175 A1 | 3/2020 | Fiocchi et al. | |
| 2023/0166655 A1 * | 6/2023 | Groben .................... | B60Q 3/60 362/511 |

FOREIGN PATENT DOCUMENTS

| | | |
|---|---|---|
| CN | 113859078 A | 12/2021 |
| CN | 219947838 U | 11/2023 |
| DE | 10 2012 007 869 A1 | 9/2013 |
| DE | 10 2020 123 723 A1 | 3/2021 |

(Continued)

OTHER PUBLICATIONS

European Search Report Dated Aug. 1, 2022, Application No. 22164924.7-1005, Applicant Joseph Voegele AG, 7 Pages.

(Continued)

*Primary Examiner* — Jason S Daniels
(74) *Attorney, Agent, or Firm* — Brooks Kushman P.C.

(57) ABSTRACT

A fresh air device for a control unit of a road making machine includes an element with at least one outlet opening for fresh air and a holder for the element, wherein the element is adjustable into different positions relative to the control unit by means of the holder.

16 Claims, 3 Drawing Sheets

(56) References Cited

FOREIGN PATENT DOCUMENTS

| | | | |
|---|---|---|---|
| EP | 0 843 044 A1 | 5/1998 | |
| EP | 2765343 A1 * | 8/2014 | ......... B60H 1/00571 |
| JP | 2014-139388 A | 7/2014 | |
| KR | 20010054637 A | 7/2001 | |
| KR | 2020-0049083 A | 5/2020 | |
| WO | 2017/209663 A1 | 12/2017 | |

OTHER PUBLICATIONS

Chinese Office Action and Search Report, Application No. 202310305453.4, Applicant: Joseph Voegele AG, dated Jun. 19, 2025 (with English machine translation) (13 pages).

\* cited by examiner

FRESH AIR DEVICE

CROSS-REFERENCE TO RELATED APPLICATIONS

This application claims foreign priority benefits under 35 U.S.C. § 119(a)-(d) to European patent application number EP 22164924.7, filed Mar. 29, 2022, which is incorporated by reference in its entirety.

TECHNICAL FIELD

The present disclosure relates to a fresh air device for a control unit of a road making machine.

BACKGROUND

During the operation of a road making machine, in particular during a pavement drive of a road finishing machine or a charger vehicle driving in front of the road finishing machine and providing the road finishing machine with paving material, vapors and bitumen-containing aerosols can arise in the direct environment at the road finishing machine or at the charger vehicle. Their formation can in particular be caused when hot paving material is delivered, distributed, or laid.

EP 0 843 044 A1 discloses a finishing machine and a charger having a suction system which is designed to suck off vapors and aerosols from a region above the spreading screw positioned in front of the screed, and to eject them above the driver protection roof of a driver control platform.

DE 10 2012 007 869 A1 also discloses a road finishing machine with a suction means by which vapors and aerosols can be sucked off along a longitudinal transport direction for paving material extending underneath the driver control platform within the chassis, and be introduced into a waste gas ejection system.

JP 2014-139388 A discloses a further suction system which is designed for suction from a region of the lateral distributor, which distributes the paving material laterally in front of the screed, and for ejection above a driver control region.

The preceding suction means are designed to suck off vapors and/or aerosols at road finishing machines or charger vehicles at the location of their formation and to eject them above a roof structure or above an operation platform set up for the driver. As experience shows, a disadvantage of this is that the performance of these suction systems is not completely sufficient to prevent vapors and/or aerosols from penetrating into the operation region of the driver or into other operation regions provided at the road finishing machine or the charger where a driver or an operator is to work.

DE 10 2020 123 723 A1 discloses a road finishing machine which comprises, seen in the production direction in front of the screed, at least one air nozzle unit for generating a vertical and/or a horizontal air curtain, wherein the air curtain produced by means of the air nozzle unit delimits the region between a first side shield and a second side shield of the screed, so that vapors of the paving material can be better sucked off from this region by a suction means. Such an air curtain has the same technical effect as a horizontal or vertical cover around the region of the spreading screw.

Furthermore, DE 10 2020 123 723 A1 discloses an air nozzle unit that is arranged at a control platform of the road finishing machine to produce an air curtain around the control platform so that vapors cannot get into the region of the control platform. Such a segregation means, however, involves quite some efforts in view of construction.

SUMMARY

It is an object of the disclosure to improve the air quality for an operator in the region of a control unit of a road finishing machine.

The disclosure relates to a fresh air device for a control unit of a road making machine, wherein the fresh air device includes at least one element with at least one outlet opening for fresh air, and at least one holder for the element. According to the disclosure, the element can be adjusted into various positions relative to the control unit by means of the holder. Thereby, an operator can individually adjust the fresh air supply generated by the element that suits him/her. Above all, the element can thereby be positioned as concerns the mouth and nose of the operator such that he or she is provided with fresh air in a targeted manner.

Preferably, the holder is adjustable without tools and/or manually by the operator. This results in a simple handling for the operator to quickly adjust the fresh air supply as required.

It is advantageous for the holder to have at least one fresh air line connected with the element. This fresh air line could be formed, for example, by a flexible hose which extends inside the holder at least in sections.

In an inexpensive variant, the holder is embodied as a gooseneck holder or a joint hose holder at least in sections. Such mountings can be quickly and freely adjusted by the operator to individually adjust the fresh air supply.

In a variant, the holder comprises at least one swivel arm. It is possible for the element to be a tubular air strip fastened to an adjustable end of the swivel arm which can be swiveled towards the operator or away from him or her.

An adjustability of the fresh air supply could be improved by the holder being connected with the element by means of a ball and socket joint. It would be conceivable that the ball and socket joint itself forms or receives a section of the fresh air line guided to the element.

According to an embodiment of the disclosure which is in particular advantageous in case of night works, the element and/or the holder include at least one light source. This light source can be used for indicating a positioning of the element and/or for indicating an adjustment of the holder. In a particularly preferred variant, the light source emits different colors in view of an air quality measured in the region of the control unit, in particular in the region of the holder and/or in the region of the element, to optically indicate this to the operator.

Preferably, the fresh air device comprises at least one sensor unit, for example, a hydrocarbon sensor unit, which is designed to measure the air quality of the fresh air supplied to the driver or the operator. It is possible that the sensor unit is configured to send its measurement data by means of near field communication (NFC), or by means of bluetooth, to a controlling system installed in the control unit. The controlling system can be designed to indicate these received measurement data by means of a display device functionally connected thereto, in particular on a display of the operational unit.

It would be conceivable that the measurement data detected with respect to the fresh air quality are made available to a construction site monitoring management system set up online, optionally summarized in a measurement data protocol, by the controlling system. Thereby, service works on site, for example the replacement of a filter unit of the fresh air device, can be coordinated externally, i.e., via a construction site monitoring management system.

In a variant, the sensor unit is an integral part of a unit carried by a person, in particular an integral part of a headset carried by the driver or the operator, VR glasses carried by the driver or the operator, and/or a smart watch carried by the driver or the operator. As an alternative or supplement, the control unit itself can include the sensor unit, and/or the sensor unit is fastened to the structure of the (driver) control platform as an independent module.

It is conceivable that the light source is supplied with power via the element and/or the holder, for example, by means of a line installed therein. As an alternative, the light source can be battery-powered.

Preferably, the element is designed as a nozzle and/or as a diffuser. As a nozzle, the element can supply fresh air to the mouth and/or the nose of the operator in a targeted way. The fresh air flow generated thereby has a high speed. As a diffuser, the element could supply the complete facial area of the operator with fresh air. It is conceivable that the element is adjustable both as a nozzle and also as a diffuser. The operator himself or herself can adjust at the element whether it is used as a nozzle or as a diffuser. For this, a rotational adjustment mechanism would be conceivable by means of which an opening degree of the outlet opening can be continuously variable.

In a preferred variant, the fresh air device includes at least one cooling and/or one air humidification unit. These variants in particular offer a comfort function for works that take place on hot summer days. A further comfort function can be given in that the fresh air transported by means of the fresh air device can be heated actively or passively. A passive heating of the fresh air could be accomplished in that exhaust air from the engine flows around at least sections of the fresh air device within the engine compartment and thereby, the fresh air transported therein can be heated. For this heat transfer, it would be useful for the section around which the air is flowing to be made of a thermally conductive material.

It is particularly advantageous for the fresh air device to include at least one filter unit and/or one deodorizing unit. The filter unit could be positioned at the inlet of the fresh air device, mainly at a location of low vapor development, for example, laterally of or below the driver control platform. The deodorizing unit could be arranged at the outlet of the fresh air device, i.e., directly in the proximity of the driver or operator. As a deodorizing unit, an aroma capsule would be possible, which can be fastened by the operator in the region of the outlet opening, for example, to the adjustable element.

According to an advantageous embodiment of the disclosure, the fresh air device is provided as an add-on kit for the control unit. The fresh air device is here provided as an attachment module that can be connected to the control unit by the operator. For this, the holder of the fresh air device could include a quick assembly coupling by means of which the holder can be directly attached to the control unit of the road making machine, or at least in the region of the control unit, preferably at a console supporting the control unit. In particular, the holder has a compressed air connector for this which can be connected to a compressed-air connection embodied at the control unit or positioned in the proximity thereof.

Preferably, the fresh air device comprises an air compressor. The air compressor can be configured as a pneumatic pump or a compressor. This air compressor can optionally also be employed for other adjustment and/or aeration functions embodied at the (driver) control platform, that means it would be available anyway.

It would be conceivable for the fresh air device to be embodied as an autarkic module designed for fresh air generation and supply. Such a module could include an own housing which can be positioned next to the control unit, preferably by means of quick coupling. According to a variant, this modular fresh air device can be fastened to a side of the control unit, for example slid onto a guidance embodied thereat.

As an alternative, it would be conceivable that the fresh air device is compatible with components already provided at the control unit, that means functionally connectable thereto, for example it is supplied with fresh air by an air compressor integrated in the control unit when it is fastened to the control unit.

The disclosure furthermore relates to a control unit for controlling and monitoring different processes of a road making machine which is in particular configured as a road finishing machine or as a charger vehicle, wherein the fresh air device is detachably fastened to the control unit. Preferably, the fresh air device forms a plug-in module at the control unit which can in particular be mounted to an input surface of the control unit. To this end, the input surface of the control unit can include a compressed-air connection compatible with the fresh air device.

It is advantageous for the control unit to include a blower device formed separately from the fresh air device. The operator can use this blower device in particular as an air-conditioning device, that means for controlling the temperature of his or her working place, while the fresh air flow generated by means of the fresh air device can be directed towards the mouth and nose of the driver or operator in a targeted way.

The disclosure furthermore relates to a road making machine, in particular a road finishing machine or a charger for a road finishing machine, wherein the road making machine includes at least one fresh air device and/or one control unit according to one of the designs described above.

At a road finishing machine, the control unit, in particular including a fresh air device attached thereto, could be provided at the driver control platform. As a supplement or an alternative to this, a fresh air device could be mountable on the road finishing machine in the region of the external control platform of the screed.

BRIEF DESCRIPTION OF THE DRAWINGS

Advantageous embodiments of the disclosure will be illustrated more in detail with reference to the figures.

Equal components are always provided with the same reference numerals in the figures.

DETAILED DESCRIPTION

Figure 1:
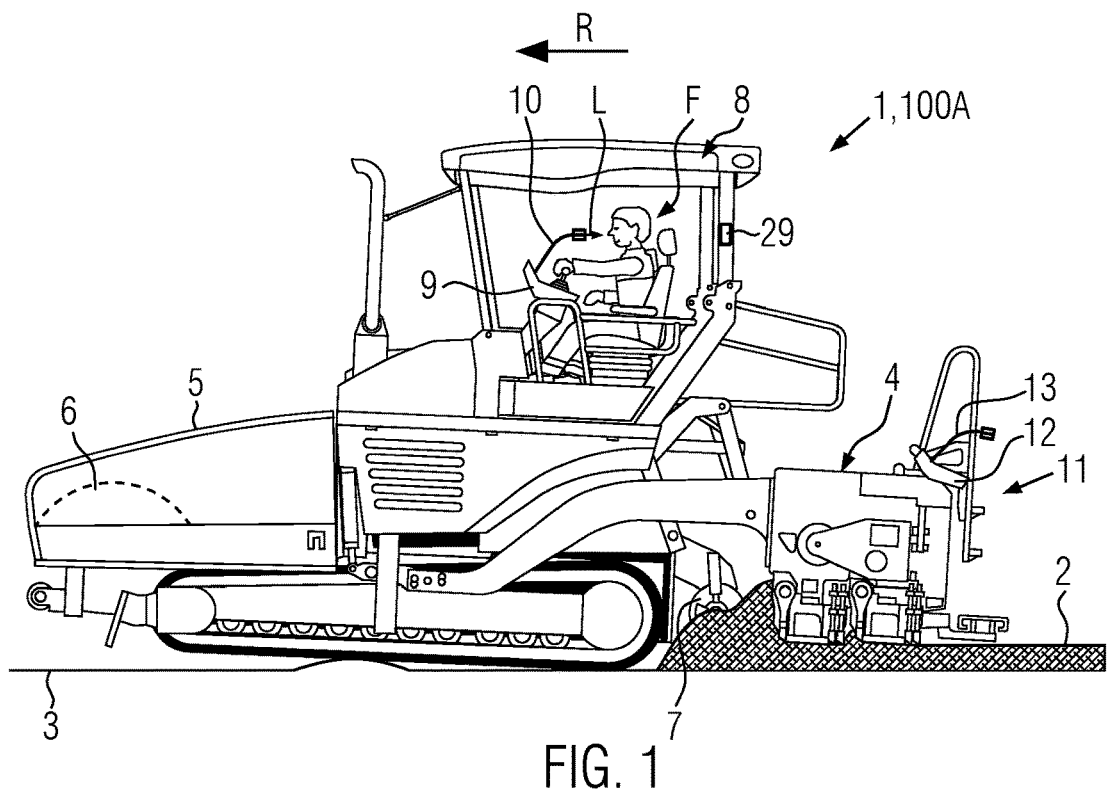
FIG. 1 shows a road making machine in the form of a road finishing machine.

FIG. 1 shows a road making machine 100A embodied in the form of a road finishing machine 1. The road finishing machine 1 is designed to produce a paving layer 2 on a subsoil 3. To this end, the road finishing machine 1 is equipped with a screed 4. In the paving direction R at the front of the road finishing machine 1, a material bunker 5 is provided for stocking paving material 6. The paving material 6 can be transported from the material bunker 5 towards the screed 4 by means of a non-depicted longitudinal conveying device opposite to the paving direction R and be spread in front of it by means of a transverse distributor 7.

The road finishing machine 1 of FIG. 1 has a driver control platform 8. The driver control platform 8 is preferably designed as an open control platform for the driver F of the road finishing machine 1 and has a control unit 9 for the driver. The control unit 9 can be used by the driver F as an input device to steer the road finishing machine 1 and to control and monitor processes running thereat. The control unit 9 provided at the driver control platform 8 has a fresh air device 10 which is designed to provide the driver F with fresh air L. The fresh air L reaches the face of the driver F directly as a flow, whereby the quality of the air inhaled by the driver F is improved.

FIG. 1 furthermore shows that the screed 4 of the road finishing machine 1 has an external control platform 11 with a control unit 12 attached thereto. Such a control unit can also be present on the other side of the screed 4. A fresh air device 13 is provided at the control unit 12 and configured to supply an operator working at the external control platform 11 with fresh air L.

Figure 2:
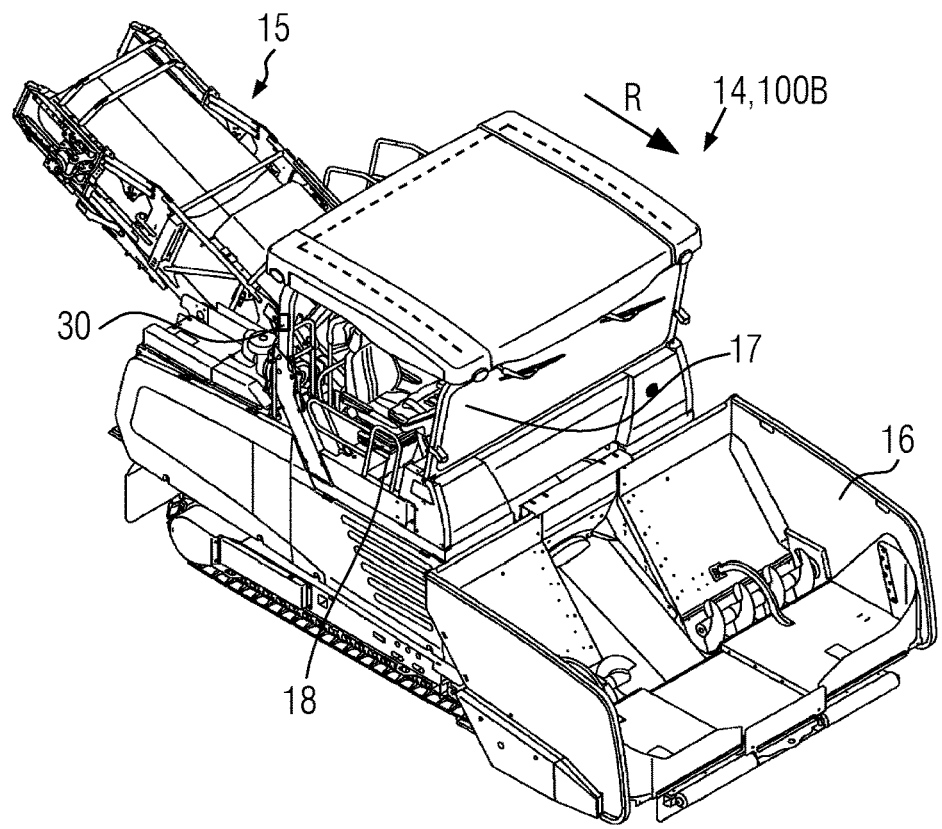
FIG. 2 shows a road making machine in the form of a charger vehicle for a road finishing machine.

FIG. 2 shows a road making machine 100B present in the form of a charger vehicle 14. The charger vehicle 14 is configured to drive ahead of the road finishing machine 1 of FIG. 1 in the paving direction R and to supply it with paving material 6. To this end, the charger vehicle 14 has a conveyor device 15 which receives the paving material 6 at the charger vehicle 14 from a material bunker 16 installed thereat and dumps it into the material bunker 5 of the road finishing machine 1.

The charger vehicle 14 has a driver control platform 17 with a control unit 18 for a driver of the charger vehicle 14. The control unit 18 of the charger vehicle 14 can include a fresh air device comparable to the fresh air device 10 of the road finishing machine 1 by which fresh air L is supplied to the driver of the charger vehicle 14 in the region where he or she inhales in a targeted way.

Figure 3:
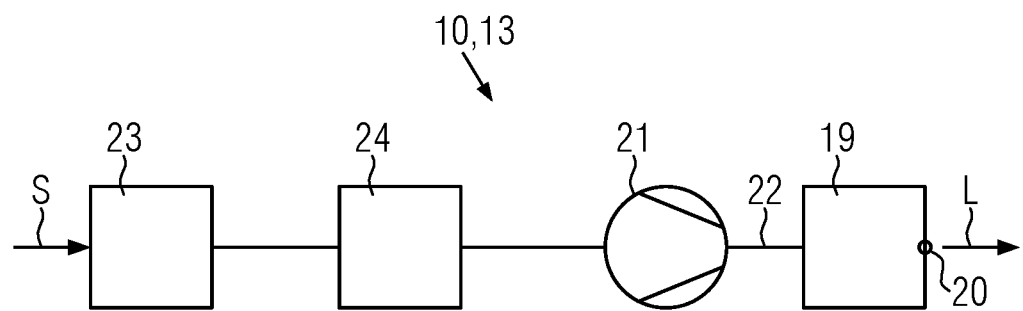
FIG. 3 shows a schematic representation of a fresh air device in an isolated representation.

FIG. 3 shows, in a schematic representation, the fresh air device 10, 13 of the control unit 9, 12, 18. The fresh air device 10, 13 includes an element 19 with an outlet opening 20 for fresh air L. The element 19 is present as a nozzle so that the fresh air L flows towards the driver F or the operator at a high flowing speed. As an alternative or furthermore, the element 19 could be designed as a diffuser to supply a larger surface of the face with fresh air L.

The fresh air device 10, 13 of FIG. 3 includes a pressure generator 21 which is connected with the element 19 by means of a holder 22. The fresh air device 10, 13 of FIG. 3 furthermore has a filter unit 23 which is designed to clean a sucked-in air flow S. A cooling and/or air humidification unit 24 of the fresh air device 10, 13 shown in FIG. 3 is provided for the pretreatment of the fresh air L.

Figure 4:
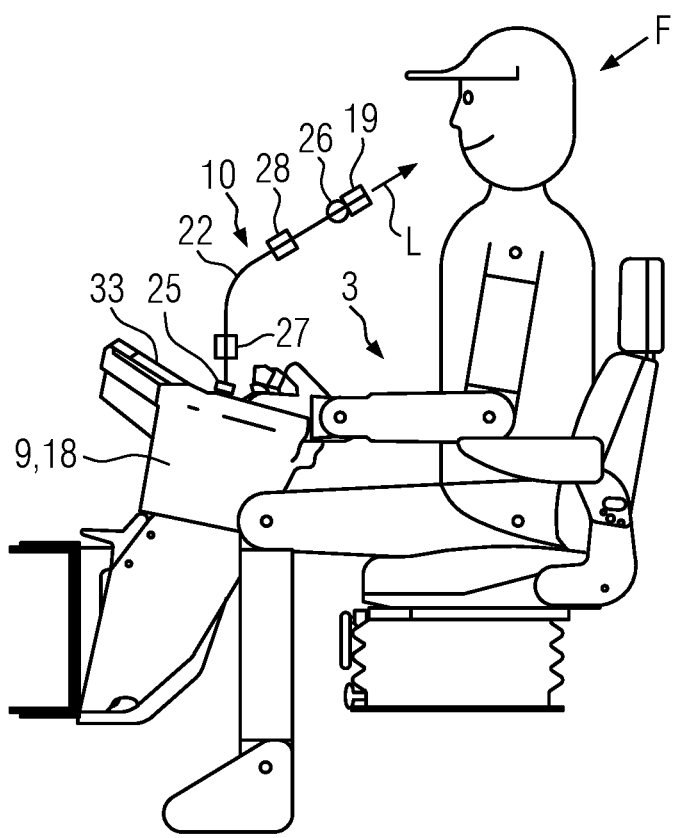
FIG. 4 shows a schematic representation of a driver control unit with a fresh air device mounted thereto.

FIG. 4 shows the control unit 9 at the driver control platform 8 of the road finishing machine 1 or the control unit 18 at the driver control platform 17 of the charger vehicle 14. In FIG. 4, the fresh air device 10 is mounted by means of a compressed air connection 25 at the control unit 9, 18. This compressed air connection 25 can be configured as a quick coupling. The fresh air device 10 of FIG. 4 includes a ball and socket joint 26 by which the holder 22 is connected with the element 19. By means of the ball and socket joint 26, the driver F can very accurately adjust a precision adjustment for an orientation of the element 19.

The fresh air device 10 of FIG. 4, in particular its holder 22, can be easily dismounted from the control unit 9, 18 by the driver F. It would be conceivable for the fresh air device 10 of FIG. 4 to be connectable with a deodorizing unit 27 preferred by the driver F in the region of the holder 22 to provide the fresh air L with a predetermined aroma.

FIG. 4 furthermore shows that the fresh air device 10 includes a light source 28 which is fastened to the holder 22. The light source 28 can be supplied with power by means of a non-depicted electric line extending through the holder 22. As an alternative, the light source 28 can be battery-powered. The light source 28 can be designed to emit different colors in response to an air quality detected at the driver control platform 8, 17, for example green if the air quality is uncritical, and red if the air includes an increased aerosol content. To this end, the light source 28 can be connected with a sensor unit 29, 30 installed at the driver control platform 8, 17 (see FIGS. 1 and 2). The sensor units 29, 30 could also be present as part of the respective control units 9, 12, 18, or be part of a smart device carried by the driver or the operator (e.g. VR glasses, smart watch, headset).

FIG. 4 furthermore shows that the control unit 9, 18 includes a blower device 33 in its input surface which in particular serves the air conditioning of the working place.

All technical features that have been described above in connection with the fresh air device 10 shown in FIG. 4 can also be present at a control unit 12 and/or a fresh air device 13 mounted at the external control platform 11 of the road finishing machine 1.

Figure 5A:
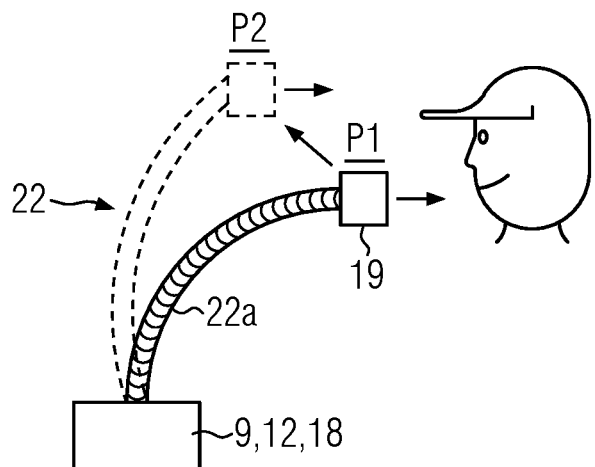
FIG. 5A shows a schematic representation of a fresh air device with a gooseneck mounting.
Figure 5B:
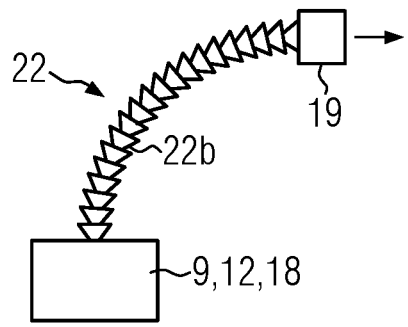
FIG. 5B shows a schematic representation of a fresh air device with a joint hose mounting.
Figure 5C:
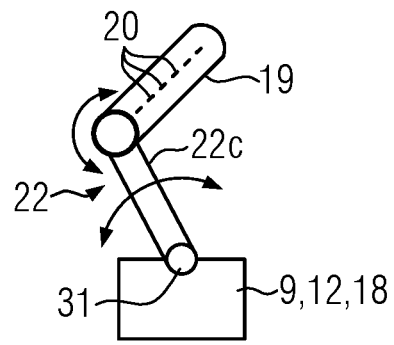
FIG. 5C shows a schematic representation of a fresh air device with a swivel arm mounting.

FIGS. 5A, 5B and 5C show various embodiments of the holder 22 which is designed to support the elements 19 such that it is adjustable in an uncomplicated way so that the driver F or the operator can be provided with fresh air L in the region where he or she inhales in a targeted way.

In FIG. 5A, the holder 22 is designed as a gooseneck holder 22a so that the element 19 is quickly and freely positionable, that means it can be individually positioned by the driver F or the operator. It is schematically shown in FIG. 5A that the element 19 can be brought into different positions P1, P2 relative to the control unit 9, 12, 18.

In FIG. 5B, the holder 22 is designed as a joint hose holder 22b. Both the gooseneck holder 22a of FIG. 5A and the joint hose holder 22b of FIG. 5B are present in the form of semi-rigid, flexible connection elements by means of which the element 19 fixed to the end thereof can be freely positioned by the driver F or the operator so that the supply of fresh air L is present at the level of his/her inhalation.

According to FIG. 5C, the holder 22 is designed as a swivel arm holder 22c. This swivel arm holder 22c is mounted at the control unit 9, 12, 18 to swivel about an axle 31.

FIG. 5C furthermore shows that the element 19 is present as a tubular nozzle with a plurality of outlet openings 20. This nozzle can be articulated at the swivel arm holder 22c.

The described fresh air devices 10, 13 can be at least partially integrated at the respective control units 9, 12, 18 of the road making machines 100A, 100B, or be at least partially detachably fastened thereto as an add-on kit. All fresh air devices 10, 13 form inexpensively manufacturable modules which can be individually adjusted by the driver F or the operator. The described holders 22a, 22b, 22c permit the element 19 from which the fresh air L flows out to be freely positionable, so that the air quality can be improved directly in the region where the driver F or the operator inhales. Due to its tubular structure, the visibility conditions of the driver F or the operator are only slightly impaired by the respective fresh air devices 10, 13.

As those skilled in the art will understand, the control units 9, 12, 18, sensor units 29, 30, as well as any other controller, unit, component, module, system, subsystem, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various methods, functions and/or operations described herein, including interaction between and/or cooperation with each other. One or more of such processors, as well as other circuitry and/or hardware, may be included in a single Application-Specific Integrated Circuitry (ASIC) or Electronic Control Unit (ECU), or several processors and various circuitry and/or hardware may be distributed among several separate components, whether individually packaged or assembled into a System-on-a-Chip (SoC).

What is claimed is:

1. A control assembly for a road making machine, the control assembly comprising a control unit for controlling and monitoring various processes of the road making machine, and a fresh air device for the control unit of the road making machine, the fresh air device is detachably fastened to the control unit, and comprises an element with at least one outlet opening for fresh air and a holder for the element, wherein the element is adjustable into different positions relative to the control unit by means of the holder.

2. The control assembly according to claim 1, wherein the holder is adjustable without tools and/or manually.

3. The control assembly according to claim 1, wherein the holder includes at least one fresh air line connected with the element.

4. The control assembly according to claim 1, wherein the holder is configured, at least in sections, as a gooseneck holder or as a joint hose holder.

5. The control assembly according to claim 1, wherein the holder comprises a swivel arm holder.

6. The control assembly according to claim 1, wherein the holder and the element are connected by a ball and socket joint.

7. The control assembly according to claim 1, wherein the element and/or the holder includes at least one light source.

8. The control assembly according to claim 1, wherein the element comprises a nozzle and/or a diffuser.

9. The control assembly according to claim 1, further comprising at least one cooling and/or air humidification unit.

10. The control assembly according to claim 1, further comprising at least one filter unit and/or deodorizing unit.

11. The control assembly according to claim 1, wherein the fresh air device is configured as an add-on kit for the control unit.

12. The control assembly according to claim 1, further comprising at least one sensor unit for measuring an air quality of the fresh air.

13. The control assembly according to claim 1, further comprising an air compressor.

14. The control assembly according to claim 1, wherein the control unit comprises a blower device embodied separately from the fresh air device.

15. A road making machine comprising the control assembly according to claim 1.

16. The road making machine of claim 15, wherein the road making machine comprises a road finishing machine or a charger for a road finishing machine.

* * * * *